United States Patent [19]

Denis

[11] 4,428,093
[45] Jan. 31, 1984

[54] SPACER FOR PIVOTALLY CONNECTING WIPER BLADE PARTS

[75] Inventor: Phillippe Denis, Glabais, Belgium

[73] Assignee: Champion Spark Plug Europe S.A., Binche, Belgium

[21] Appl. No.: 337,964

[22] Filed: Jan. 8, 1982

[30] Foreign Application Priority Data

Jan. 9, 1981 [FR] France ............... 81 00269

[51] Int. Cl.³ .................... B60S 1/04
[52] U.S. Cl. .................... 15/250.42
[58] Field of Search .......... 15/250.32–250.42

[56] References Cited

U.S. PATENT DOCUMENTS

| 3,408,679 | 11/1968 | Deutscher et al. | 15/250.42 |
|---|---|---|---|
| 3,585,672 | 6/1971 | Habert | 15/250.42 |
| 3,733,642 | 5/1973 | Schmid | 15/250.42 |
| 3,864,783 | 2/1975 | Arman | 15/250.42 |
| 4,009,504 | 3/1977 | Arman | 15/250.42 |

FOREIGN PATENT DOCUMENTS

| 5656 | 4/1979 | European Pat. Off. | |
|---|---|---|---|
| 1809096 | 7/1970 | Fed. Rep. of Germany . | |
| 2354782 | 7/1976 | Fed. Rep. of Germany . | |
| 2302889 | 3/1975 | France . | |
| 2398645 | 7/1977 | France . | |
| 2456010 | 6/1979 | France . | |
| 608994 | 2/1979 | Switzerland | 15/250.42 |
| 1089210 | 7/1966 | United Kingdom . | |
| 1183446 | 3/1968 | United Kingdom . | |
| 2041730 | 2/1979 | United Kingdom . | |

*Primary Examiner*—Peter Feldman
*Attorney, Agent, or Firm*—Wood, Dalton, Phillips, Mason & Rowe

[57] ABSTRACT

A two part pivot connection is provided between the articulated members of an assembly, such as between two relatively movable members of a windshield wiper blade. One part of the connection is mounted on one member with the second part of the connection being mounted on the second member. One of the parts has projecting circular bosses or cylinders which mate with openings or recesses in the other part such that the two members are relatively movable in a plane transverse to the common axes of the cylinders and of the openings.

9 Claims, 20 Drawing Figures

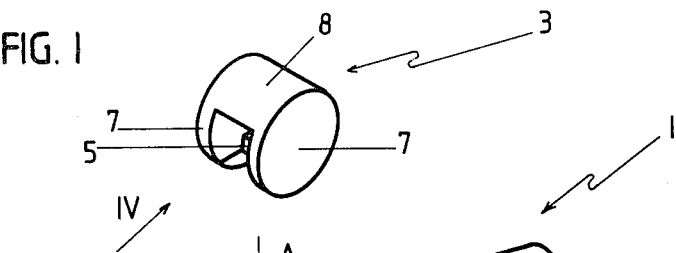
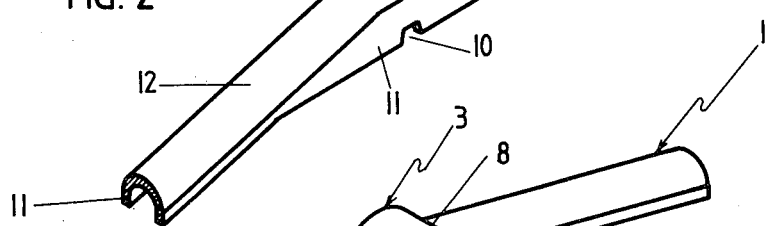
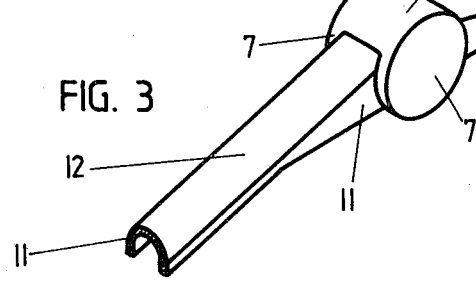
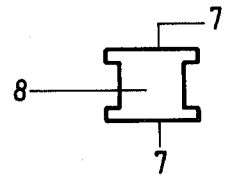
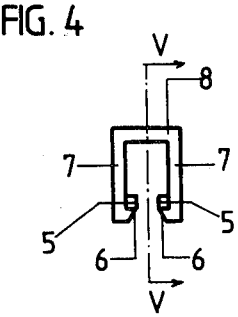
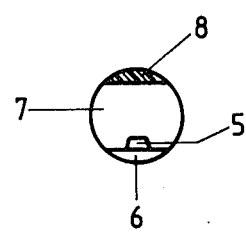
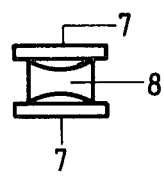
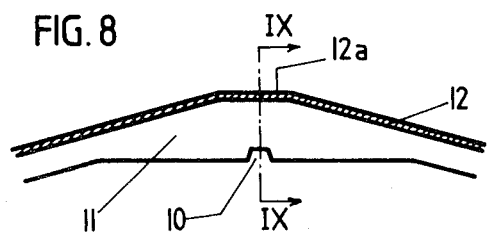
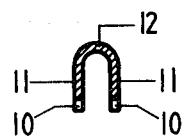

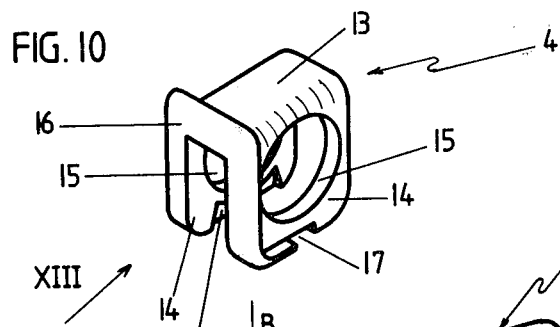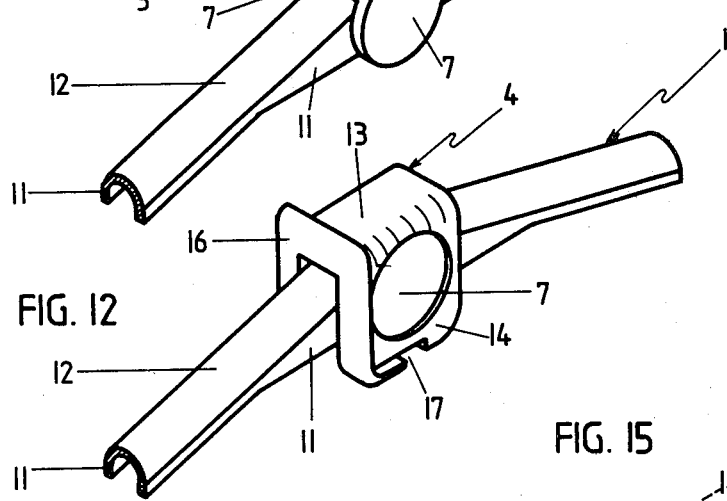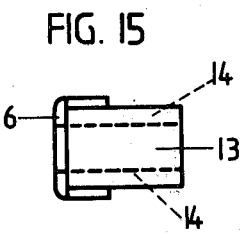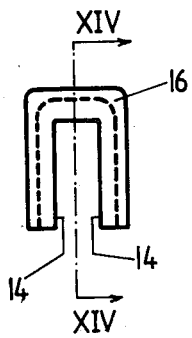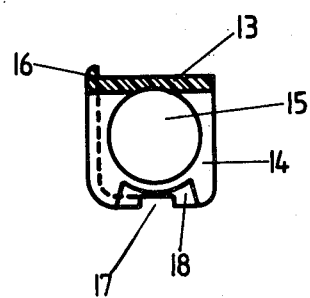

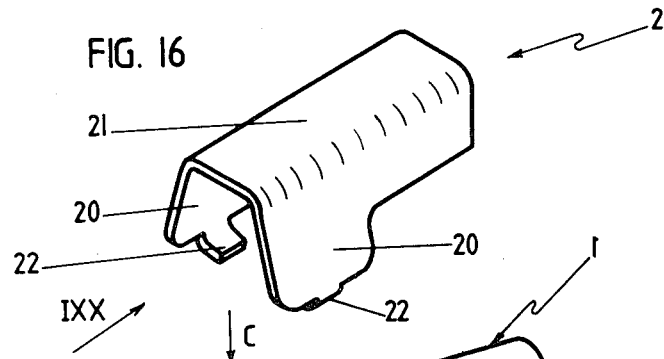
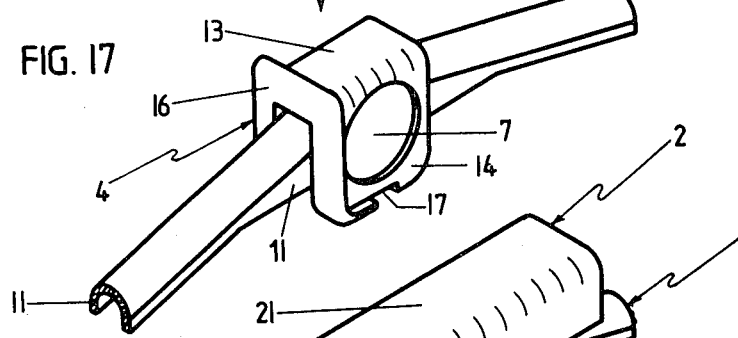
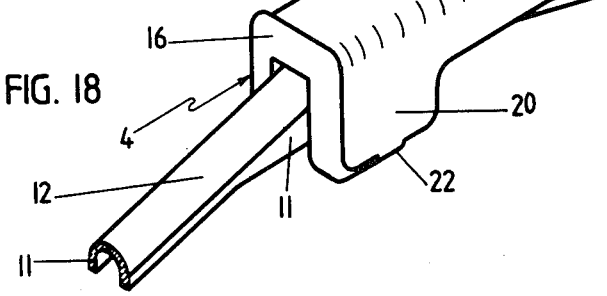
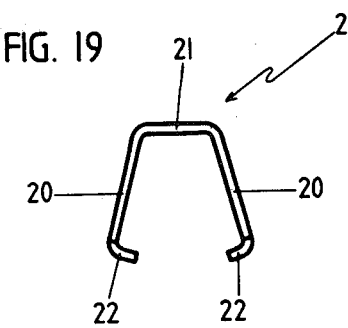
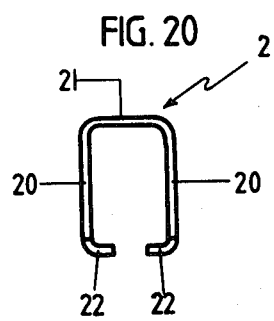

SPACER FOR PIVOTALLY CONNECTING WIPER BLADE PARTS

DESCRIPTION

Technical Field

The present invention relates to a connecting device for pivotally connecting two yokes of a wiper blade. Such devices are for example used in the wiper blades for motor vehicles.

Background Art

Connecting devices of the above described type are known in prior art and more especially through British patent application No. 2,038,167 wherein a U-shaped connecting device is disclosed which comprises two short pins on both of its flanges, one projecting towards the inside and the other projecting towards the outside. The two pins projecting towards the inside form an articulation between the two yokes of the wiper blade and the two pins projecting towards the outside are held in two corresponding circular openings provided in the two flanges of the largest of the two yokes, which both have a substantially U-shaped cross section. The form and the size of this connecting device is such that it cannot move with respect to the largest of the two yokes. On the contrary, the smaller yoke may slightly rotate with respect to the connecting device and consequently with respect to the larger yoke.

A disadvantage of the connecting device disclosed in said British patent application is the following. Once the connecting device has been mounted on the smaller yoke, the larger yoke is mounted on the connecting device with its two flanges obliquely apart. These two flanges are then pushed towards the corresponding flanges of the connecting device and the two pins of the connecting device which project outwardly enter into the corresponding circular openings provided in the two flanges of the larger yoke. If the flanges of the larger yoke are pushed towards the flanges of the connecting device only up to the point where they touch the flanges of the connecting device, said flanges of the larger yoke will, because of their own resiliency, have the tendency to move apart again and consequently to at least partly disengage said circular openings from the outwardly directed pins of the connecting device. There is therefore a serious risk that when a tractive force is applied to the wiper blade, the pivot connection, or articulation, will fail.

On the other hand, if, when mounting the larger yoke on the connecting device, the two flanges of said larger yoke are pressed too firmly against the connecting device, not only this device, but also the smaller yoke risks to be damaged and the resulting deformations might prevent the correct working of the connection.

Disclosure Of The Invention

These drawbacks are eliminated in the connecting device according to the invention. The device is substantially characterized by the fact that it is made of two parts, the first of said two parts being rigidly secured to the first of the two yokes and the second of said two parts being rigidly secured to the second of the two yokes.

Said second part of the connecting device is substantially U-shaped, each of its two flanges being provided with a circular opening wherein a corresponding cylindrical portion of said first part of the device may snap into. A pivot connection has thus been realized since the two cylindrical portions of said first part may pivot in the two circular openings of said second part.

Other features of the invention will be better understood when reading the following portions of the description in conjunction with the accompanying drawings.

Brief Description Of The Drawings

FIG. 1 is a perspective view of the first part of the connecting device according to the invention;

FIG. 2 is a perspective view of a first yoke of the wiper blade;

FIG. 3 is a perspective view of the first part of the connecting device, mounted on the first yoke of the wiper blade;

FIG. 4 is an elevational view along arrow IV of FIG. 1;

FIG. 5 is a sectional view along line V—V of FIG. 4;

FIG. 6 is a top view of FIG. 5;

FIG. 7 is a bottom view of FIG. 5;

FIG. 8 is a longitudinal section of the first yoke;

FIG. 9 is a sectional view along line IX—IX of FIG. 8;

FIG. 10 is a perspective view of the second part of the connecting device according to the invention;

FIG. 11 is a perspective view identical to that of FIG. 3;

FIG. 12 is a perspective view of the second part of the connecting device, mounted on the first part of the device and on the first yoke of the wiper blade;

FIG. 13 is an elevational view along arrow XIII of FIG. 10;

FIG. 14 is a sectional view along line XIV—XIV of FIG. 13;

FIG. 15 is a top view of FIG. 14;

FIG. 16 is a perspective view of one of the extremities of the second yoke of the wiper blade;

FIG. 17 is a perspective view identical to that of FIG. 12;

FIG. 18 is a perspective view of the second yoke mounted on the first yoke of the wiper blade;

FIG. 19 is an elevational view along arrow XIX of FIG. 16;

FIG. 20 is an elevational view of one of the extremities of the second yoke when it is mounted on the first yoke of the wiper blade.

Best Mode For Carrying Out The Invention

When the connecting device (FIGS. 1 and 10) has been mounted onto the two yokes 1,2 of the wiper blade, the whole assembly has the configuration as shown on FIG. 18, i.e. the central portion of the first yoke 1 is pivotally connected to one of the two extremities of the second yoke 2 of the wiper blade.

FIGS. 1 and 4–7 show the first part 3 of the connecting device according to the invention. The transverse section of this part 3 is substantially U-shaped (FIG. 4), each of its two resilient flanges 7 being provided, at its lower internal portion, with a hook 5. The mounting of part 3 onto the central portion 12a of the first yoke 1 (FIGS. 1,2,3) is executed by pushing it downwards as indicated by arrow "A" until said two hooks 5 snap into the corresponding notches 10 provided at the lower portion of the two flanges 11 of the first yoke 1. At this moment the internal surface of the web of part 3 rests on the central portion 12a of the web 12 of the yoke 1 which has a substantially U-shaped transverse section. In order to facilitate the mounting of part 3 onto the yoke 1, the lower portion of the two flanges 7 may be provided with inclined surfaces 6 (FIG. 4).

FIG. 3 shows part 3 rigidly mounted on the yoke 1. On this figure it can be seen that said part 3 has the general form of a cylinder, the two extremities 7 of which slightly projecting from the two corresponding flanges 11 of the yoke 1. As will be shown later on, it is these two extremities (or flanges) 7 which act as pivot axis between the two yokes 1,2 of the wiper blade.

FIGS. 10 and 13-15 show the second part 4 of the connecting device according to the invention. Just as for part 3, the transverse section of this part 4 is substantially U-shaped (FIG. 13). Each of the two flanges 14 of part 4 is provided with a circular opening 15, the diameter of which substantially corresponding to the one of said cylindrical extremities 7 of part 3. When assembling, part 4 is pushed downwards onto part 3 (FIGS. 10, 11, 12) as indicated by arrow "B", until said cylindrical portion 7 of part 3 snap into the corresponding openings 15 provided in the flanges 14 of part 4. In order to facilitate the mounting of part 4 onto part 3, the lower internal portion of the two flanges 14 may be provided with inclined surfaces 18.

FIG. 12 shows parts 3 and 4 mounted on the yoke 1. Part 3 being rigidly mounted on yoke 1, part 4 cannot execute a sliding movement with respect to part 3 or with respect to the yoke 1. On the contrary said same part 4 can slightly rotate about the cylindrical portions 7 of part 3.

FIGS. 16-18 show how one of the extremities of the second yoke 2 is mounted on part 4 and consequently on the first yoke 1; the extremity of the yoke 2 is pushed downwards—as indicated by arrow "C"—with its two flanges 20 spreading obliquely aside (FIGS. 16, 19) in order to allow part 4 to pass between the two latching lugs 22. Once the internal surface of the web 21 of the yoke 2 touches the upper surface of the web 13 of part 4, the two flanges 20 are pushed one towards the other until said two lugs 22 project into the notches 17 provided in the lower portion of the two flanges 14 of part 4. At this moment the pivot connection between the central portion of the yoke 1 and one of the extremities of the yoke 2 is readily for operation and at this connecting point the extremity of the yoke 2 has the configuration shown on FIG. 20.

It is to be noted that the pivot connecting device according to the invention avoids any metal to metal contact between the two yokes 1,2 since it is preferably made of an appropriate plastic material whereas the two yokes are preferably made of an appropriate steel. Furthermore sharp steel edges are avoided by covering the extremities of the second yoke 2 with a U-shaped shouldering 16 which is an integral part of part 4 of the connecting device.

A new pivot connecting device for wiper blades has thus been described by way of example. It is however to be understood that changes and modifications may be made without departing from the scope of the invention such as defined in the appended claims. It is, for example, evident that the functions of parts 3,4 of the connecting device may be inverted by providing the two flanges 7 of part 3 with circular openings and by providing the two flanges 14 of part 4 with two corresponding inwardly directed cylindrical portions.

What is claimed is:

1. A connecting device for pivotally connecting two yokes of a wiper blade, characterized in that said connecting device is comprised of two separate parts, the first part of said two parts being secured to the first of the two yokes, the second of said two parts being secured to the second of the two yokes and means on said first part rotatably engaging with mating means on the second part for pivotally connecting the two yokes together.

2. A device according to claim 1, characterized in that said first part has inwardly projecting means for snap fitting into contact with said first yoke for securing said first part to the first yoke.

3. A device according to claim 2, characterized in that said inwardly projecting means comprises two resilient hooks capable of snapping into corresponding notches provided in said first yoke.

4. A device according to claim 2, characterized in that said first part comprises at each of two side extremities a cylindrical portion, which cylindrical portions have a common axis perpendicular to the longitudinal central plane of said first yoke.

5. A device according to claim 4, characterized in that said second part is substantially U-shaped with two spaced apart flanges, said two flanges are each provided with a circular opening having a diameter that substantially corresponds to the diameter of the cylindrical portions of said first part.

6. A device according to claim 5, characterized in that the two flanges of said second part are resilient and allow the snapping of the two cylindrical parts of said first part into said circular openings.

7. A device according to claim 5 wherein the extremities of said second yoke are substantially U-shaped with two spaced apart flanges, said two flanges of said second yoke are each provided, at their lower portion, with a latching lug, characterized in that said lugs project into corresponding notches provided in the lower portion of the two flanges of said second part.

8. A device according to claim 7, characterized in that said second part is provided with a shoulder which covers the U-shaped extreme edge of said second yoke.

9. A device according to claim 1, characterized in that said two parts are made out of an appropriate plastic material.

* * * * *